United States Patent
Maus et al.

[11] Patent Number: 5,902,558
[45] Date of Patent: May 11, 1999

[54] DISKWISE-CONSTRUCTED HONEYCOMB BODY, IN PARTICULAR CATALYST CARRIER BODY AND APPARATUS FOR CATALYTIC CONVERSION OF EXHAUST GASES

[75] Inventors: Wolfgang Maus; Rolf Brück, both of Bergisch Gladbach; Hans Bode, Remscheid; Udo Martin, Wuppertal, all of Germany

[73] Assignee: Emitec Gesellschaft fuer Emissionstechnologie mbH, Lohmar, Germany

[21] Appl. No.: 08/824,443

[22] Filed: Mar. 26, 1997

Related U.S. Application Data

[63] Continuation of application No. PCT/EP95/03762, Sep. 22, 1995.

[30] Foreign Application Priority Data

Sep. 26, 1994 [DE] Germany .............................. 44 34 363
Oct. 7, 1994 [DE] Germany .............................. 44 35 913

[51] Int. Cl.$^6$ .................................................. B01D 53/34
[52] U.S. Cl. .......................... 422/181; 422/176; 422/177; 422/180; 502/527.19; 502/527.22
[58] Field of Search ............................ 422/171, 173–174, 422/177, 176, 181, 199, 180, 220, 222; 502/439, 527.19, 527.22; 428/593–594, 116; 55/DIG. 30; 60/299–300

[56] References Cited

U.S. PATENT DOCUMENTS

| | | | |
|---|---|---|---|
| 3,811,845 | 5/1974 | Nakamura | 422/181 |
| 4,383,974 | 5/1983 | Fratzer et al. | 422/181 |
| 5,157,010 | 10/1992 | Maus et al. | 502/439 |
| 5,382,774 | 1/1995 | Bruck et al. | 219/553 |
| 5,393,499 | 2/1995 | Bagley et al. | 422/174 |
| 5,512,250 | 4/1996 | Betta et al. | 422/173 |
| 5,645,803 | 7/1997 | Steenackers et al. | 422/177 |

FOREIGN PATENT DOCUMENTS

| | | |
|---|---|---|
| 0245736A1 | 11/1987 | European Pat. Off. . |
| 0567034A1 | 10/1993 | European Pat. Off. . |
| 676534 | 11/1995 | European Pat. Off. . |
| 8900467 | 6/1990 | Germany . |
| 4029749A1 | 3/1992 | Germany . |
| 4311513A1 | 10/1993 | Germany . |
| 9315010 | 5/1994 | Germany . |
| 4339025A1 | 6/1994 | Germany . |

*Primary Examiner*—Hien Tran
*Attorney, Agent, or Firm*—Herbert L. Lerner; Laurence A. Greenberg

[57] ABSTRACT

A honeycomb body, in particular a catalyst carrier body, for catalytic conversion of exhaust gases in an exhaust gas system, especially an exhaust gas system of an internal combustion engine, preferably an Otto engine, includes a central channel and adjacent discs defining a multiplicity of curved outer channels bounded by the discs. The outer channels extend outwards from the central channel and have one end opening into the central channel. At least some of the disks have a macrostructure forming a lateral boundary of the outer channels. An apparatus for catalytic conversion of exhaust gases includes a housing having an exhaust inlet opening and an exhaust outlet opening, and the honeycomb body disposed in the housing. An additional microstructure in some or all of the disks can increase the effectiveness of the catalytic conversion.

10 Claims, 3 Drawing Sheets

DISKWISE-CONSTRUCTED HONEYCOMB BODY, IN PARTICULAR CATALYST CARRIER BODY AND APPARATUS FOR CATALYTIC CONVERSION OF EXHAUST GASES

CROSS-REFERENCE TO RELATED APPLICATION

This application is a Continuation of International application Ser. No. PCT/EP95/03762, filed Sep. 22, 1995.

BACKGROUND OF THE INVENTION

Field of the Invention

The invention relates to a honeycomb body, in particular a catalyst carrier body, for catalytic conversion of exhaust gases in an exhaust system, especially an exhaust system of an internal combustion engine, preferably an Otto engine, having a multiplicity of channels, each opening at one end into a central channel. The invention also relates to an apparatus for catalytic conversion of exhaust gases.

Such honeycomb bodies with catalytically active coatings are also known as radial catalytic converters. Such a device is described in an article in the journal "VDI-Nachrichten" [News of the Association of German Engineers], No. 38, Sep. 24, 1993, page 11, entitled "Kat auf dem Weg zu High-Tech" [Catalytic Converters on the Way to High-Tech].

SUMMARY OF THE INVENTION

It is accordingly an object of the invention to provide a diskwise-constructed honeycomb body, in particular a catalyst carrier body and an apparatus for catalytic conversion of exhaust gases, which improve the catalytic conversion of exhaust gases and which are simple to manufacture.

With the foregoing and other objects in view there is provided, in accordance with the invention, a honeycomb body, in particular a catalyst carrier body, for catalytic conversion of exhaust gases in an exhaust gas system, especially an exhaust gas system of an internal combustion engine, preferably an Otto engine, comprising a central channel, and adjacent discs defining a multiplicity of curved outer channels bounded by the discs, extending outwards from the central channel and having one end opening into the central channel, at least some of the disks having a macrostructure forming a lateral boundary of the outer channels.

The honeycomb body of the invention is distinguished in that the channels extend outward in a curve from the central channel. As a result of this feature, the channels become longer without having to change the outer dimensions of the carrier body.

With respect to its outer dimensions, the carrier body can be constructed flexibly, with the same catalytically active surface area. The channels are bounded by disks contacting one another, and at least some of the disks have a macrostructure that forms the lateral boundary of the channels, and which, for example, can have a height of approximately 0.5 to 5 mm.

This honeycomb body structure has the advantage of being simple to manufacture, since the macrostructure can be imposed, for example, by embossing upon the disks. Another advantage of this structure is considered to be that the (catalytically active) surface area can be adapted relatively simply to the intended purpose of the catalyst carrier body, by varying the number of disks or channels.

In accordance with another feature of the invention, the channels have a different curvature from one another.

In accordance with a further feature of the invention, the macrostructures on individual disks are curved differently from one another. The carrier body can have channels with a curvature that is the same but which have a different cross section. The catalyst carrier body can be adapted to the demands made of it by constructing the catalyst carrier body of disks that have macrostructures with the same and/or different curvature. A modular structure of the carrier body is thus made possible, and a defined spacing between the disks can be attained by alternating disks with and without macrostructures or disks with differently curved macrostructures.

In accordance with an added feature of the invention, the individual channels extend outward from the central channel in approximately involute fashion. Due to their definition, the involutes have the same spacing everywhere, and as a result the free flow cross section of the channels in the flow direction is approximately constant.

In accordance with an additional feature of the invention, the individual outer channels deviate from an ideal involute form and extend at a tangent from the central region.

In accordance with yet another feature of the invention, the outer channels have an approximately constant free flow cross section in a flow direction.

In accordance with yet a further feature of the invention, there is provided an alternating configuration of disks with a macrostructure and disks with a microstructure, wherein the macrostructure and the microstructure intersect at an angle.

The advantage of this kind of improvement is that the microstructure interferes with the flow in the channel, causing turbulence within the flow. Turbulence in the flow has the advantage of interfering with the flow layer and the diffusion layer at the catalyst surface, so that the mass transfer between the exhaust gas and the catalyst is improved.

In accordance with yet an added feature of the invention, the microstructure is provided by forming embossed features which are disposed concentrically with the central channel. The term "microstructure" is understood herein to mean that the structure has only approximately 5 to 30% of the height of the macrostructure.

In accordance with yet an additional feature of the invention, the microstructure is formed by embossed features that intersect at an angle.

In accordance with again another feature of the invention, the disks with a macrostructure also have microstructures extending at an angle to the macrostructure, in order to increase the effectiveness of catalytic conversion.

With the objects of the invention in view there is also provided an apparatus for catalytic conversion of exhaust gases, comprising a housing having an exhaust inlet opening and an exhaust outlet opening; and a honeycomb body disposed in the housing, the honeycomb body having a central channel and adjacent discs defining a multiplicity of curved outer channels bounded by the discs, extending outwards from the central channel and having one end opening into the central channel, at least some of the disks having a macrostructure forming a lateral boundary of the outer channels.

The course of the exhaust gas flow is advantageously directed in such a way that the flow through the carrier body is from the inside outward. In accordance with another feature of the invention, to that end, the central channel communicates with the exhaust inlet opening. This course of the flow has the advantage of causing the operating temperature in the center of the carrier body that is required for the catalytic conversion to be attained relatively quickly. Due to this feature, the apparatus has a relatively high response speed.

In accordance with a further feature of the invention, the central channel communicates with the exhaust outlet opening.

In accordance with an added feature of the invention, the central channel has a closed end opposite the exhaust inlet and outlet openings.

In accordance with a concomitant feature of the invention, in order to further reduce pollutant emissions during a cold-starting phase, the carrier body is heated electrically or electromagnetically. Electrically heatable carrier bodies are known, for instance, from Published International Patent Application WO 92/18245, corresponding to U.S. Pat. No. 5,382,774.

Although the invention is illustrated and described herein as embodied in a diskwise-constructed honeycomb body, in particular a catalyst carrier body and an apparatus for catalytic conversion of exhaust gases, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings

DESCRIPTION OF THE PREFERRED EMBODIMENTS

Figure 1:
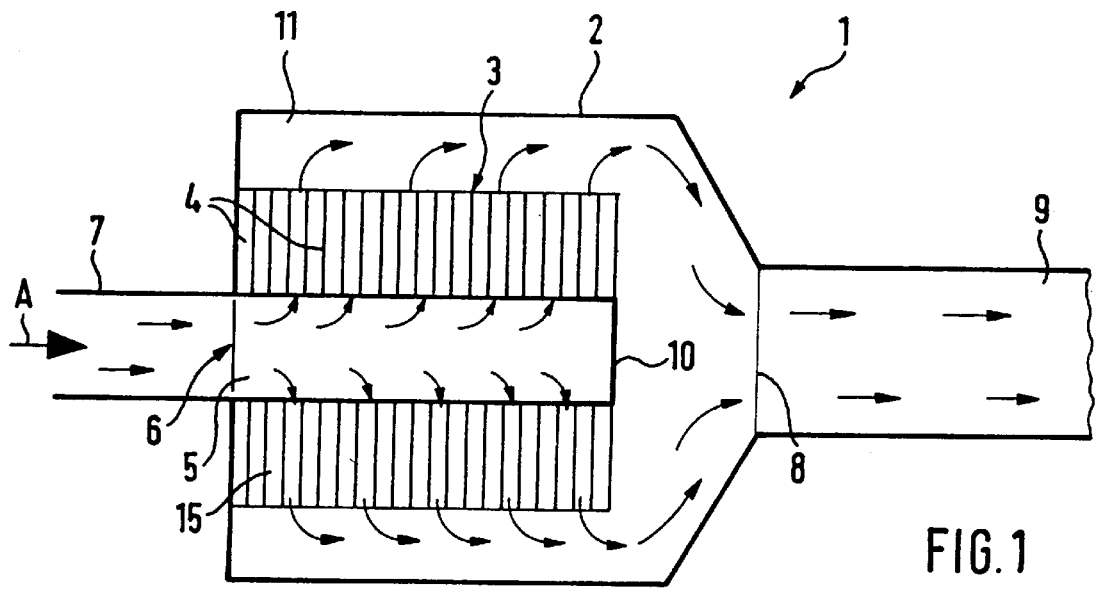
FIG. 1 is a fragmentary, diagrammatic, longitudinal-sectional view of a first exemplary embodiment of an apparatus according to the invention.

Referring now to the figures of the drawings in detail and first, particularly, to FIG. 1 thereof, there is seen an apparatus 1 for catalytic conversion of exhaust gases in an exhaust system. The apparatus includes a housing 2, in which a honeycomb catalyst carrier body 3 is disposed. The catalyst carrier body 3 has a number of outer channels 4. Each outer channel opens into a central channel 5. The central channel 5 communicates with an exhaust inlet opening 6 of the housing 2. The exhaust inlet opening 6 of the housing 2 communicates with an exhaust tube 7, which is part of an exhaust system.

The housing 2 has an exhaust outlet opening 8, which communicates with a further exhaust tube 9. An end 10 of the central channel 5 opposite the exhaust inlet and outlet openings 6, 8 is closed.

The carrier body 3 is spaced apart from the housing 2, so that a gap 11 exists between the carrier body 3 and the housing 2.

Exhaust gas A which flows from a non-illustrated engine through the exhaust tube 7, flows through the exhaust inlet opening 6 into the central channel 5. The exhaust gas flows from the central channel 5 through the outer channels 4 of the carrier body 3. The exhaust gas flows by way of the gap 11 and the exhaust outlet opening 8 of the housing 2 into the exhaust tube 9.

Figure 2:
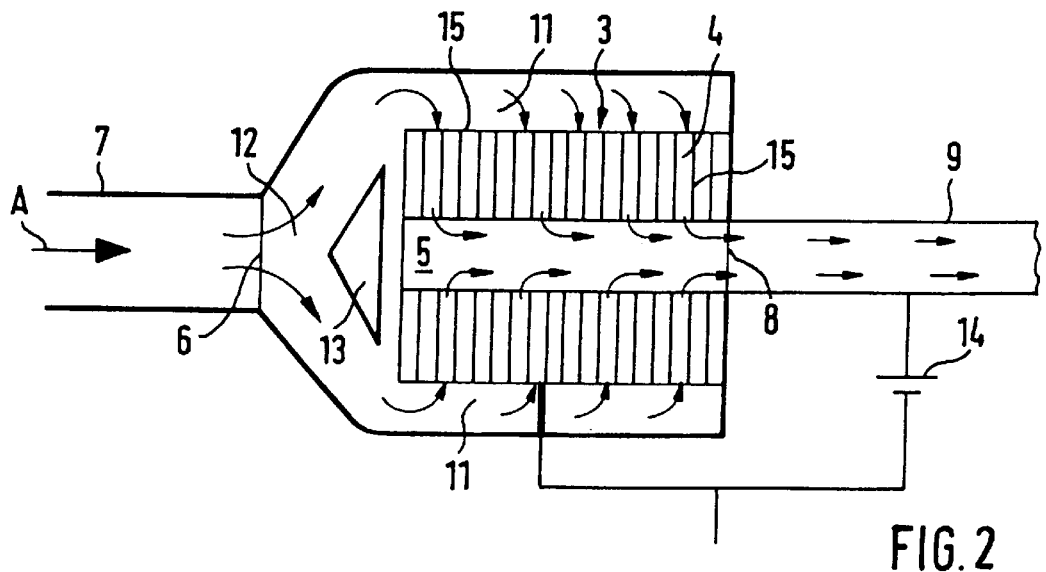
FIG. 2 is a longitudinal-sectional view of a second exemplary embodiment of the apparatus.

FIG. 2 shows a second exemplary embodiment. The second exemplary embodiment differs from the first exemplary embodiment of FIG. 1 in the course of the exhaust gas flow. In the first exemplary embodiment, the exhaust gas flows through the carrier body from the inside outward. In the second exemplary embodiment, the exhaust gas flows through the carrier body 3 from the outside inward.

A baffle 13 that deflects the exhaust gas flow toward the gap 11 is provided in an exhaust inlet region 12. In terms of fluidics, such a baffle is advantageous because pressure losses can be reduced as a result of its use.

In the exemplary embodiment of FIG. 2, the carrier body 3 is also electrically heatable. To that end, a voltage source 14 is connected through the central channel 5 to the inside of the carrier body 3. An outer surface of the carrier body 3 is likewise connected to the voltage source 14.

Figure 3:
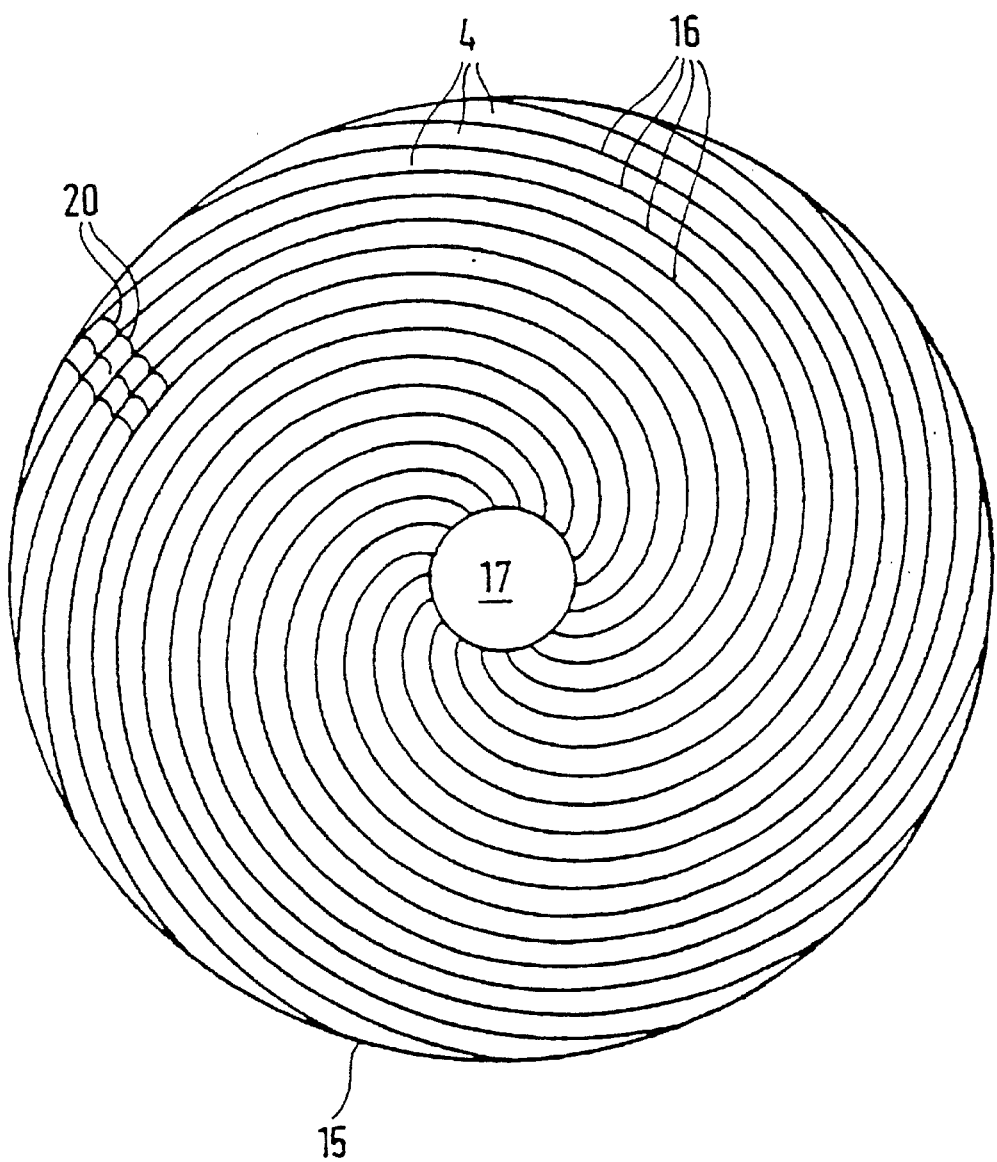
FIG. 3 is a plan view of a disk.

The carrier body 3 is constructed of a number of disks contacting one another. FIG. 3 shows a disk 15 that has a macrostructure 16. The macrostructure 16 forms a lateral boundary of the channels 4. The outer channels 4 extend outward in approximately involute form from a central region 17. The disk can additionally have a microstructure 20 that extends at an angle to the macrostructure.

Figure 4:
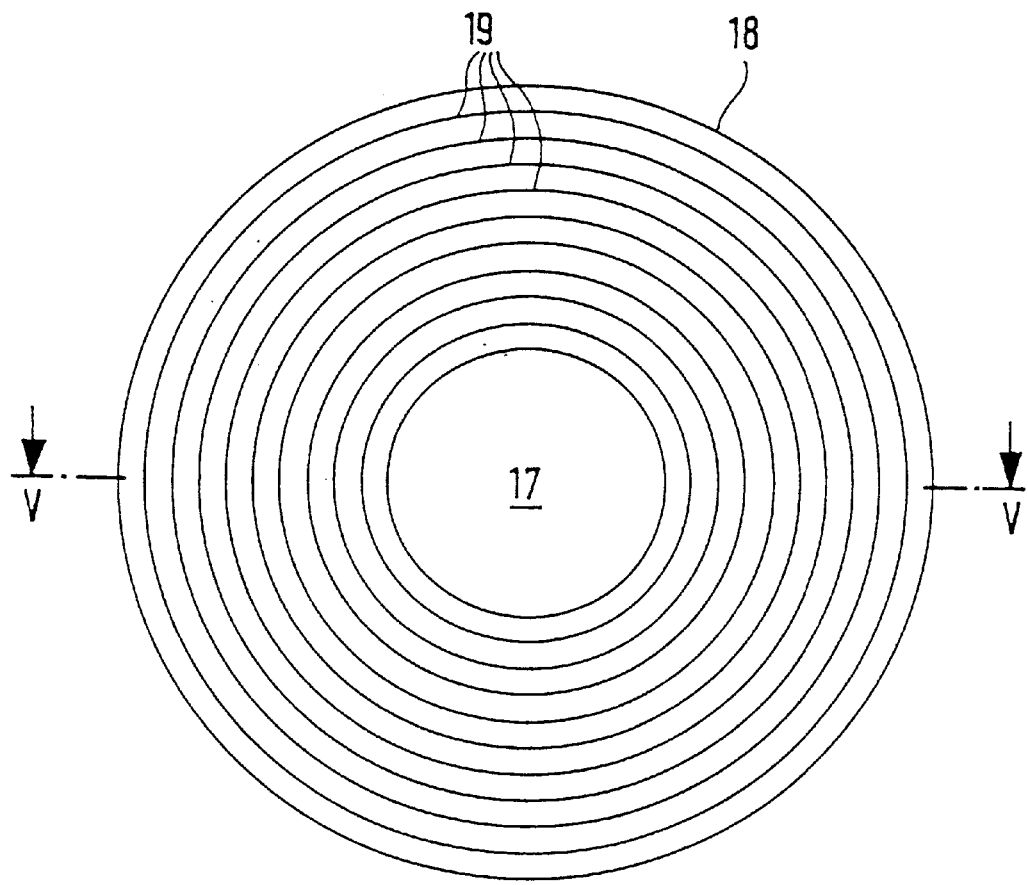
FIG. 4 is a plan view of a disk with a microstructure.
Figure 5:
FIG. 5 is a cross-sectional view taken along a line V—V of FIG. 4, in the direction of the arrows.

FIGS. 4 and 5 show a disk 18 with a microstructure 19. The microstructure 19 includes embossed features formed concentrically with the central region 17. The central region 17 acts as an opening, which forms the central channel 5 when the carrier body has been assembled. Microstructures 19 can be formed on only one side or preferably on both sides of a disk. Preferably, they follow one another at a spacing of from 0.5 to 10 times the height of the macrostructure.

Honeycomb bodies according to the invention can be used even in cases where the space available is poor, because of their flexible structure.

We claim:

1. A honeycomb body, comprising:

a central channel; and adjacent disks defining a multiplicity of curved outer channels bounded by said disks, extending outwards from said central channel and each of said curved outer channels having a first end opening into said central channel and a second end opening into a peripheral region of said honeycomb body, said curved outer channels extend individually outward in an approximately involute form from said central channel, at least some of said disks having a macrostructure forming a lateral boundary of said outer channels, said disks with said macrostructure also having a microstructure extending at an angle to said macrostructure.

2. The honeycomb body according to claim 1, wherein said outer channels have a different curvature from one another.

3. The honeycomb body according to claim 2, wherein at least some of said disks have differently curved macrostructures.

4. The honeycomb body according to claim 1, wherein said outer channels have an approximately constant free flow cross section in a flow direction.

5. The honeycomb body according to claim 1, wherein some of said disks have only a microstructure and alternate with said disks having said macrostructure, and said macrostructure and said microstructure of said disks having only a microstructure intersect at an angle.

6. The honeycomb body according to claim 5, wherein said microstructure includes embossed features constructed concentrically to said central channel.

7. The honeycomb body according to claim 5, wherein said microstructure of said disks having only a microstructure is formed by embossed features intersecting at an angle.

8. The honeycomb body according to claim 1, including a device for heating said honeycomb body.

9. The honeycomb body according to claim 8, wherein said device heats said honeycomb body electrically.

10. The honeycomb body according to claim 8, wherein said device heats said honeycomb body electromagnetically.

\* \* \* \* \*